(12) United States Patent
Hong

(10) Patent No.: US 12,328,706 B2
(45) Date of Patent: Jun. 10, 2025

(54) METHODS AND APPARATUSES FOR RECEIVING PAGING SIGNALING, AND METHODS AND APPARATUSES FOR TRANSMITTING PAGING SIGNALING

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 446 days.

(21) Appl. No.: 17/732,868

(22) Filed: Apr. 29, 2022

(65) Prior Publication Data

US 2022/0256497 A1 Aug. 11, 2022

Related U.S. Application Data

(63) Continuation-in-part of application No. PCT/CN2019/114302, filed on Oct. 30, 2019.

(51) Int. Cl.
*H04W 68/00* (2009.01)
*H04W 76/10* (2018.01)
*H04W 88/06* (2009.01)

(52) U.S. Cl.
CPC ......... *H04W 68/005* (2013.01); *H04W 76/10* (2018.02); *H04W 88/06* (2013.01)

(58) Field of Classification Search
CPC .......................... H04W 68/005; G06F 13/1668
See application file for complete search history.

(56) References Cited

U.S. PATENT DOCUMENTS

| | | | | |
|---|---|---|---|---|
| 2008/0109656 A1* | 5/2008 | Kotzin | ................ | H04L 63/0853 726/30 |
| 2011/0077031 A1* | 3/2011 | Kim | .................. | H04W 52/0251 455/458 |
| 2012/0172029 A1* | 7/2012 | Lai | ........................ | H04W 68/00 455/422.1 |
| 2018/0368101 A1* | 12/2018 | Agiwal | ................. | H04W 68/00 |
| 2021/0105607 A1* | 4/2021 | Ioffe | .................... | H04W 60/005 |
| 2021/0105738 A1* | 4/2021 | Bendlin | ................. | H04W 8/24 |

FOREIGN PATENT DOCUMENTS

| | | |
|---|---|---|
| CN | 104469734 A | 3/2015 |
| CN | 104581992 A | 4/2015 |
| CN | 108933992 A | 12/2018 |

(Continued)

OTHER PUBLICATIONS

ISA State Intellectual Property Office of the People's Republic of China, International Search Report Issued in Application No. PCT/CN2019/114302, Jul. 21, 2020, WIPO, 4 pages.

(Continued)

*Primary Examiner* — Fabricio R Murillo Garcia
(74) *Attorney, Agent, or Firm* — Volpe Koenig

(57) ABSTRACT

The present disclosure provides a method for receiving paging signaling, the method includes: receiving paging signaling through a first SIM card in a plurality of SIM cards; determining that the paging signaling received through the first SIM card comprises information of a second SIM card in the plurality of SIM cards; and transmitting the information of the second SIM card to the second SIM card through the first SIM card.

13 Claims, 8 Drawing Sheets

```
Paging signaling is received through the first SIM card in the plurality of
SIM cards                                                              — S11

It is determined that the paging signaling received through the first SIM
card includes information of the second SIM card in the plurality of SIM — S12
cards The information of the second SIM card is transmitted to the second SIM
card through the first SIM card                                        — S13
```

(56) References Cited

FOREIGN PATENT DOCUMENTS

| | | |
|---|---|---|
| CN | 110234176 A | 9/2019 |
| CN | 110311766 A | 10/2019 |
| EP | 3591948 A1 | 1/2020 |
| WO | 2018171012 A1 | 9/2018 |
| WO | 2019164212 A1 | 8/2019 |

OTHER PUBLICATIONS

State Intellectual Property Office of the People's Republic of China, Office Action and Search Report Issued in Application No. 2019800027630, Jun. 1, 2021, 15 pages. (Submitted with Machine/Partial Translation).

State Intellectual Property Office of the People's Republic of China, Office Action and Search Report Issued in Application No. 2019800027630, Jan. 29, 2022, 8 pages. (Submitted with Machine/Partial Translation).

\* cited by examiner

Paging signaling is transmitted during a paging occasion of receiving the paging signaling through a first SIM card, wherein the paging signaling includes information of the second SIM card ~S21

FIG. 7

The second SIM card associated with the first SIM card is determined according to a pre-recorded association relationship between the first SIM card and the second SIM card ~S22

Paging signaling is transmitted during a paging occasion of receiving the paging signaling through a first SIM card, wherein the paging signaling includes information of the second SIM card ~S21

FIG. 8

The association relationship between the first SIM card and the second SIM card sent by the first SIM card is received when there is a communication connection with the first SIM card, and/or the association relationship between the first SIM card and the second SIM card sent by the second SIM card is received when there is a communication connection with the second SIM card ~S23

The second SIM card associated with the first SIM card is determined according to a pre-recorded association relationship between the first SIM card and the second SIM card ~S22

Paging signaling is transmitted during a paging occasion of receiving the paging signaling through a first SIM card, wherein the paging signaling includes information of the second SIM card ~S21

FIG. 9

METHODS AND APPARATUSES FOR RECEIVING PAGING SIGNALING, AND METHODS AND APPARATUSES FOR TRANSMITTING PAGING SIGNALING

CROSS REFERENCE TO RELATED APPLICATIONS

This application is a continuation-in-part of International Application No. PCT/CN2019/114302 filed on Oct. 30, 2019, the disclosure of which is hereby incorporated by reference in its entirety.

TECHNICAL FIELD

The present disclosure relates to the field of communication technologies, in particular to methods for receiving paging signaling, methods for transmitting paging signaling, apparatuses for receiving paging signaling, apparatuses for transmitting paging signaling, and electronic devices.

BACKGROUND

In order to improve the flexibility of a user in using a mobile phone, a plurality of Subscriber Identification Module (SIM) cards can be set in the mobile phone, so that the user can use different SIM cards to communicate respectively.

In the related art, for an operator's network, different SIM cards are regarded as different mobile phones. While communicating with a specific SIM card, a base station only uses a specific resource corresponding to the specific SIM card.

SUMMARY

In view of this, embodiments of the present disclosure provide methods for receiving paging signaling, methods for transmitting paging signaling, apparatuses for receiving paging signaling, apparatuses for transmitting paging signaling and electronic devices to solve technical problems in the related art.

According to a first aspect of the embodiments of the present disclosure, there is provided a method for receiving paging signaling, the method is applicable to a terminal including a plurality of Subscriber Identification Module (SIM) cards, and the method includes:
 receiving paging signaling through a first SIM card in the plurality of SIM cards;
 determining that the paging signaling received through the first SIM card includes information of a second SIM card in the plurality of SIM cards; and
 transmitting the information of the second SIM card to the second SIM card through the first SIM card.

Optionally, the information of the second SIM card includes at least one of:
 an identifier of the second SIM card and an indication bit of a system message.

Optionally, the information of the second SIM card includes the identifier of the second SIM card, and the method further includes:
 establishing a communication connection with a base station according to the identifier of the second SIM card after the second SIM card is activated.

Optionally, the information of the second SIM card includes the indication bit of the system message, and the method further includes:
 updating a system message of a base station according to the indication bit of the system message after the second SIM card is activated.

Optionally, the method further includes:
 recording information of each SIM card in the plurality of SIM cards receiving the paging signaling through the first SIM card during a paging occasion.

Optionally, determining that the paging signaling received through the first SIM card includes the information of the second SIM card in the plurality of SIM cards, includes:
 comparing information in the paging signaling with the recorded information of each SIM card when it is determined that the paging signaling includes information of the first SIM card;
 if the information in the paging signaling is the same as information of the second SIM card in the recorded information of the plurality of SIM cards, determining that the paging signaling includes the information of the second SIM card.

Optionally, the method further includes:
 updating information of a changed SIM card in the plurality of SIM cards through the first SIM card when any one of the plurality of SIM cards is changed.

According to the second aspect of the embodiments of the present disclosure, there is provided a method for transmitting paging signaling, the method is applicable to a base station, and the method includes:
 transmitting paging signaling during a paging occasion of receiving the paging signaling through a first SIM card, wherein the paging signaling includes information of a second SIM card.

Optionally, the method further includes:
 before transmitting the paging signaling during the paging occasion of receiving the paging signaling through the first SIM card, determining the second SIM card associated with the first SIM card according to a pre-recorded association relationship between the first SIM card and the second SIM card.

Optionally, the method further includes:
 before determining the second SIM card associated with the first SIM card according to the pre-recorded association relationship between the first SIM card and the second SIM card, receiving the association relationship between the first SIM card and the second SIM card sent by the first SIM card when there is a communication connection with the first SIM card, and/or receiving the association relationship between the first SIM card and the second SIM card sent by the second SIM card when there is a communication connection with the second SIM card.

Optionally, the paging signaling further includes information of the first SIM card.

Optionally, the information of the second SIM card includes at least one of:
 an identifier of the second SIM card and an indication bit of a system message.

According to a third aspect of the embodiments of the present disclosure, there is provided an apparatus for receiving paging signaling, the apparatus is applicable to a terminal including a plurality of SIM cards, and the apparatus includes:
 a paging receiving module configured to receive paging signaling through a first SIM card in the plurality of SIM cards;
 an information determining module configured to determine that the paging signaling received through the first SIM card includes information of a second SIM card in the plurality of SIM cards; and an information transmitting module configured to transmit the information of the second SIM card to the second SIM card through the first SIM card.

Optionally, the information of the second SIM card includes at least one of:

an identifier of the second SIM card and an indication bit of a system message.

Optionally, the information of the second SIM card includes the identifier of the second SIM card, and the apparatus further includes:

a connection establishing module configured to establish a communication connection with a base station according to the identifier of the second SIM card through the second SIM card after the second SIM card is activated.

Optionally, the information of the second SIM card includes the indication bit of the system message, and the apparatus further includes:

a message updating module configured to update a system message of the base station according to the indication bit of the system message through the second SIM card after the second SIM card is activated.

Optionally, the apparatus further includes:

an information recording module configured to record information of each SIM card in the plurality of SIM cards.

Optionally, the information determining module is configured to compare information in the paging signaling with the recorded information of each SIM card through the first SIM card when it is determined that the paging signaling includes information of the first SIM card; and if the information in the paging signaling is the same as information of the second SIM card in the recorded information of the plurality of SIM cards, determine that the paging signaling includes the information of the second SIM card.

Optionally, the apparatus further includes:

an information updating module configured to update information of a changed SIM card in the plurality of SIM cards through the first SIM card when any one of the plurality of SIM cards is changed.

According to a fourth aspect of the embodiments of the present disclosure, there is provided an apparatus for transmitting paging signaling, the apparatus is applicable to a base station, and the apparatus includes:

a signaling transmitting module configured to transmit paging signaling during a paging occasion of receiving the paging signaling through a first SIM card, wherein the paging signaling includes information of the second SIM card.

Optionally, the apparatus further includes:

a relationship recording module configured to determine the second SIM card associated with the first SIM card according to a pre-recorded association relationship between the first SIM card and the second SIM card.

Optionally, the apparatus further includes:

a relationship receiving module configured to receive the association relationship between the first SIM card and the second SIM card sent by the first SIM card when there is a communication connection with the first SIM card, and/or receive the association relationship between the first SIM card and the second SIM card sent by the second SIM card when there is a communication connection with the second SIM card.

Optionally, the paging signaling further includes information of the first SIM card.

Optionally, the information of the second SIM card includes at least one of:

an identifier of the second SIM card and an indication bit of a system message.

According to a fifth aspect of the embodiments of the present disclosure, there is provided an electronic device, including:

a processor; and a memory configured to store instructions executable by the processor, wherein the processor is configured to implement the method for receiving paging signaling according to any one of the above embodiments.

According to a sixth aspect of the embodiments of the present disclosure, there is provided an electronic device, including:

a processor; and a memory configured to store instructions executable by the processor, wherein the processor is configured to implement the method for transmitting paging signaling according to any one of the above embodiments.

According to the embodiments of the present disclosure, the base station can transmit the paging signaling during the paging occasion of receiving the paging signaling through the first SIM card, and the broadcasted paging signaling can carry the information of the second SIM card. In the process of using the first SIM card, the terminal can receive the paging signaling broadcasted by the base station, and transmit the information related to the second SIM card in the paging signaling to the second SIM card, so that the second SIM card can receive the information of the second SIM card in the paging signaling when the second SIM card is not used by the terminal for communication.

Further, after the second SIM card is activated, a communication connection can be established with the base station based on the information of the second SIM card in the paging signaling, without waiting for the paging occasion during which the paging signaling is received through the second SIM card to receive the paging signaling. Compared with the related art, the second SIM card can receive the information of the second SIM card in the paging signaling in advance, instead of waiting for the paging occasion during which the paging signaling is received through the second SIM card to receive the information in the paging signaling. This is beneficial to reducing a delay in establishing the communication connection between the second SIM card and the base station.

BRIEF DESCRIPTION OF THE DRAWINGS

To describe the technical solutions in the embodiments of the present application more clearly, the accompanying drawings for describing the embodiments are briefly introduced below. Obviously, the accompanying drawings in the following description are merely some embodiments of the present application, and for a person of ordinary skill in the art, other drawings can be derived from the accompanying drawings without creative efforts.

FIG. 7 is a schematic flowchart illustrating a method for transmitting paging signaling according to an embodiment of the present disclosure.

FIG. 8 is a schematic flowchart illustrating another method for transmitting paging signaling according to an embodiment of the present disclosure.

FIG. 9 is a schematic flowchart illustrating yet another method for transmitting paging signaling according to an embodiment of the present disclosure.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are merely some of the possible embodiments of the present application, rather than all of the possible embodiments. Based on the embodiments described in the present application, all other embodiments obtained by a person of ordinary skill in the art without creative efforts all belong to the scope of protection of the present application.

Figure 1:
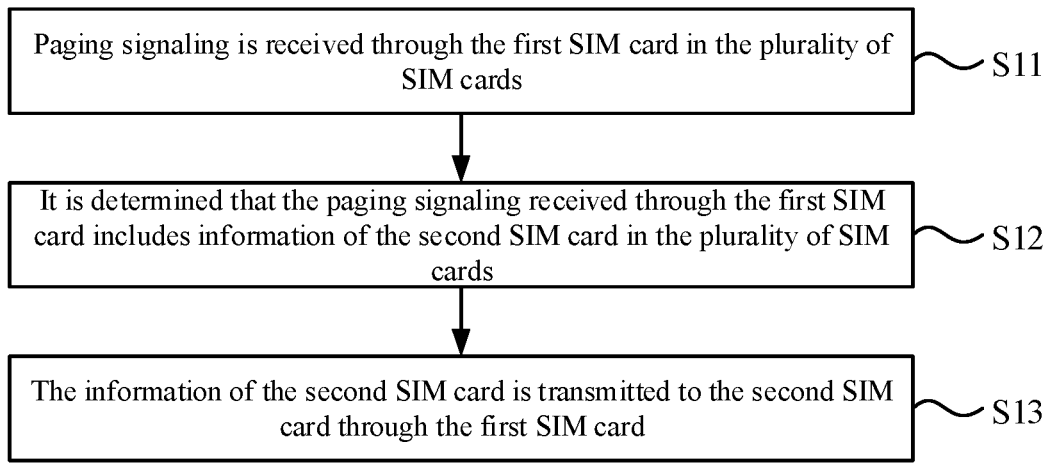
FIG. 1 is a schematic flowchart illustrating a method for receiving paging signaling according to an embodiment of the present disclosure.

FIG. 1 is a schematic flowchart illustrating a method for receiving paging signaling according to an embodiment of the present disclosure. The method for receiving paging signaling described in this embodiment can be applicable to a terminal provided with one or more SIM cards. The terminal includes but is not limited to mobile phones, tablet computers, wearable devices, and other electronic devices. The terminal may include a plurality of SIM cards, which may belong to the same operator or different operators. The technical solutions of the present disclosure will be exemplarily explained below mainly in the case that the plurality of SIM cards include a first SIM card and a second SIM card.

As shown in FIG. 1, the method for receiving paging signaling may include the following steps:

in step S11, paging signaling is received through the first SIM card in the plurality of SIM cards; specifically, the paging signaling can be received during a paging occasion of receiving the paging signaling through the first SIM card;

in step S12, it is determined that the paging signaling received through the first SIM card includes information of the second SIM card in the plurality of SIM cards;

in step S13, the information of the second SIM card is transmitted to the second SIM card through the first SIM card.

In the related art, when a communication connection needs to be established with a certain SIM card, a base station can transmit the paging signaling during the paging occasion (PO) of receiving the paging signaling through the SIM card, and information such as an identifier of the SIM card can be carried in the paging signaling. The paging signaling can be received during the paging occasion of receiving the paging signaling through the SIM card. When the paging signaling is received, whether the identifier carried in the paging signaling is the identifier of the SIM card itself can be determined, and if the identifier is the identifier of the SIM card itself, the communication connection can be established with the base station. For different SIM cards, the paging occasion of receiving paging signaling may be different.

For example, if a communication connection needs to be established with the second SIM card in the terminal, the base station can transmit paging signaling during a paging occasion of receiving the paging signaling through the second SIM card, and an identifier of the second SIM card can be carried in the transmitted paging signaling.

Although the terminal is provided with the first SIM card and the second SIM card, when the base station transmits the paging signaling carrying the identifier of the second SIM card, the second SIM card may not be activated by the terminal, but the first SIM card is activated by the terminal for communication. Since the first SIM card only receives the paging signaling during the paging occasion of receiving the paging signaling through the first SIM card, the terminal cannot receive the paging signaling carrying the identifier of the second SIM card broadcasted by the base station. That is, the second SIM card cannot timely determine that the base station needs to establish a communication connection with the second SIM card. Even after the second SIM card is activated, the paging signaling carrying the identity of the second SIM card cannot be received until the paging occasion during which the paging signaling is received through the second SIM card, and then the communication connection with the base station can be established. This causes a delay in establishing the communication connection between the second SIM card and the base station to a certain extent.

According to embodiments of the present disclosure, the base station can transmit the paging signaling during the paging occasion of receiving the paging signaling through the first SIM card, and information of the second SIM card, such as the identifier of the second SIM card, can be carried in the broadcasted paging signaling. In the process of using the first SIM card (the first SIM card can be in an idle state, a connected state, or an inactive state), the terminal can receive the paging signaling broadcasted by the base station, and determine the information included in the paging signaling by analyzing the paging signaling.

Each SIM card in the plurality of SIM cards can send its own information to the first SIM card in advance. For example, the information can be directly sent to the first SIM card, or can be sent to the terminal first and then sent to the first SIM card by the terminal, so that the first SIM card can pre-record the information of each SIM card in the plurality of SIM cards.

Further, after the information in the paging signaling is determined through the first SIM card, the information in the paging signaling can be compared with the recorded information of the plurality of SIM cards. For example, if the information in the paging signaling is an identifier of a SIM card, the identifier of the SIM card in the paging signaling can be compared with an identifier of each SIM card in the plurality of SIM cards to determine whether the paging signaling includes the information of the second SIM card in the plurality of SIM cards. If the information in the paging signaling is the same as that of the second SIM card in the plurality of SIM cards, it can be determined that the paging signaling includes the information of the second SIM card.

When it is determined that the paging signaling contains the information of the second SIM card, the information of the second SIM card, such as the identifier of the second SIM card, can be sent to the second SIM card through the first SIM card, so that the second SIM card can receive the information of the second SIM card in the paging signaling when the second SIM card is not used by the terminal for communication.

Further, after the second SIM card is activated, a communication connection (such as initiating random access) can be established with the base station based on the information of the second SIM card in the paging signaling, without waiting for the paging occasion during which the paging signaling is received through the second SIM card to receive the paging signaling. Compared with the related art, the second SIM card can receive the information of the second SIM card in the paging signaling in advance instead of waiting for the paging occasion during which the paging signaling is received through the second SIM card to receive the information of the second SIM card in the paging signaling, which is beneficial to reducing the delay of establishing the communication connection between the second SIM card and the base station.

Optionally, the information of the second SIM card includes at least one of:
  the identifier of the second SIM card and an indication bit of a system message.

In an embodiment, the paging signaling can not only carry the identifier of the second SIM card, but also can carry the indication bit of the system message. A communication connection can be established with the base station through the second SIM card according to the identifier of the second SIM card in the paging signaling. Whether a system message needs to be updated can be determined according to the indication bit of the system message in the paging signaling. If the system message needs to be updated, a system message is received from the base station after the second SIM card is activated, so as to update the system message about the base station.

It should be noted that the first SIM card and the second SIM card do not specifically refer to a certain SIM card in the plurality of SIM cards, but any one of the plurality of SIM cards. The first SIM card and the second SIM card are different SIM cards in the plurality of SIM cards.

Figure 2:
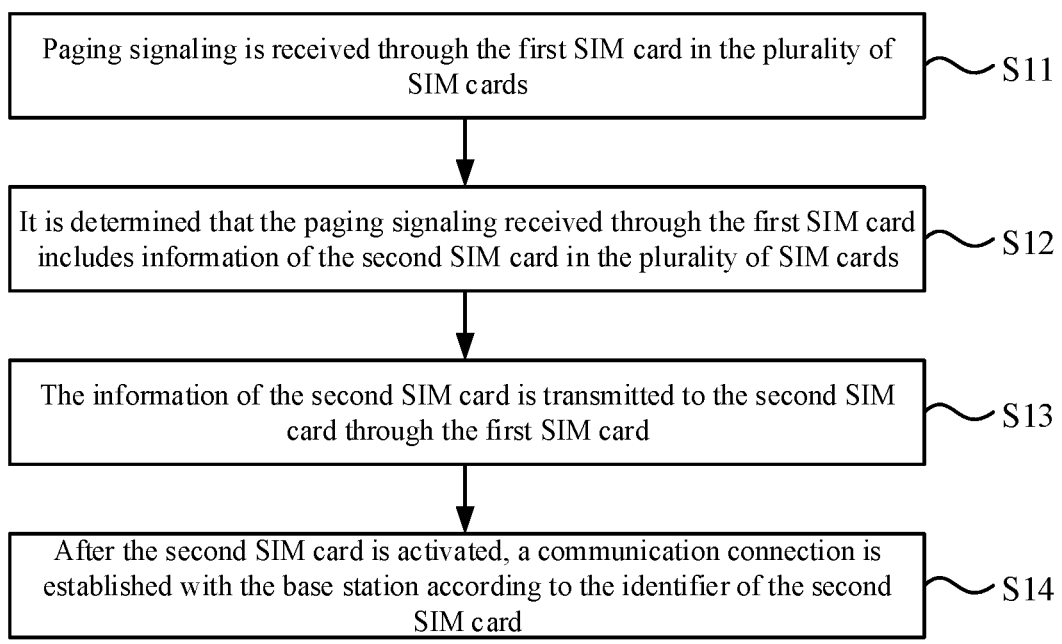
FIG. 2 is a schematic flowchart illustrating another method for receiving paging signaling according to an embodiment of the present disclosure.

FIG. 2 is a schematic flowchart illustrating another method for receiving paging signaling according to an embodiment of the present disclosure. As shown in FIG. 2, the information of the second SIM card includes the identifier of the second SIM card, and the method further includes:
  in step S14, after the second SIM card is activated, a communication connection is established with the base station according to the identifier of the second SIM card.

In an embodiment, the information of the second SIM card in the paging signaling transmitted by the first SIM card to the second SIM card can be the identifier of the second SIM card. According to the identifier of the second SIM card, it can be determined that the base station needs to establish a communication connection with the second SIM card, and the communication connection can be established with the base station after the second SIM card is activated.

Figure 3:
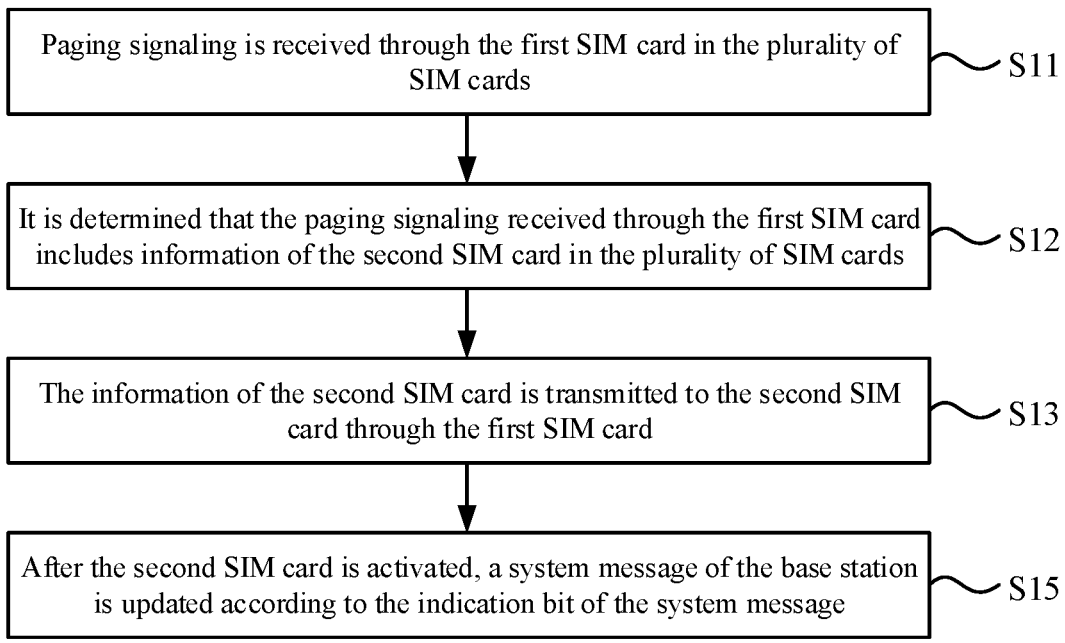
FIG. 3 is a schematic flowchart illustrating yet another method for receiving paging signaling according to an embodiment of the present disclosure.

FIG. 3 is a schematic flowchart illustrating yet another method for receiving paging signaling according to an embodiment of the present disclosure. As shown in FIG. 3, the information of the second SIM card includes the indication bit of the system message, and the method further includes:
  in step S15, after the second SIM card is activated, a system message of the base station is updated according to the indication bit of the system message.

In an embodiment, the information of the second SIM card in the paging signaling transmitted by the first SIM card to the second SIM card can be the indication bit of the system message. Whether the system message needs to be updated can be determined according to the indication bit of the system message in the paging signaling. For example, it can be determined whether the indication bit of the system message is the same as a pre-stored indication bit of the system message. If the indication bit of the system message is not the same as the pre-stored indication bit of the system message, it is determined that the system message needs to be updated, and a system message is received from the base station after the second SIM card is activated, so as to update the system message about the base station.

Figure 4:
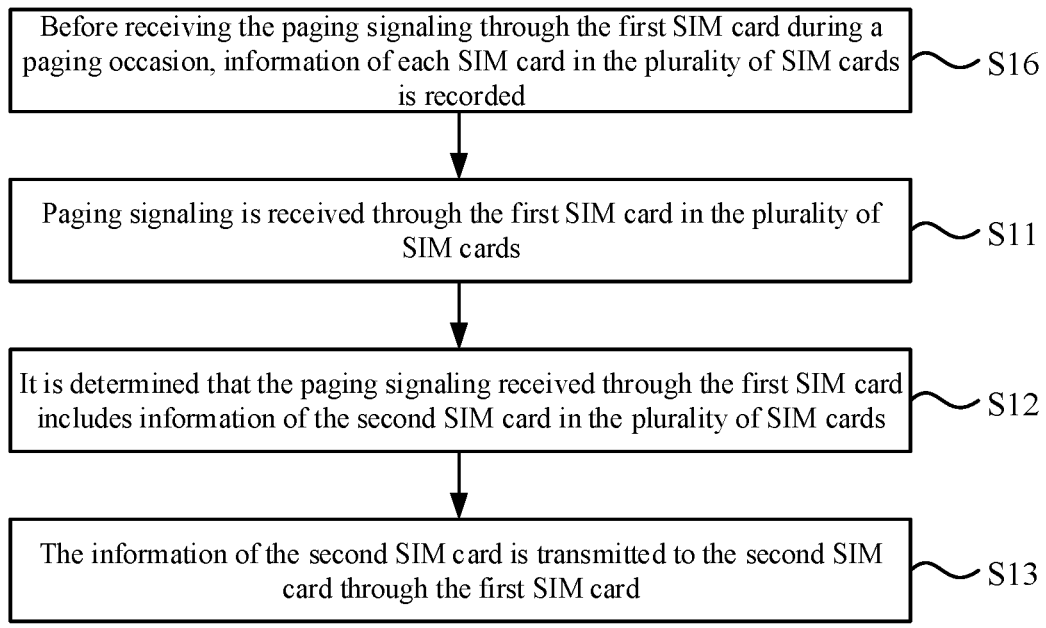
FIG. 4 is a schematic flowchart illustrating yet another method for receiving paging signaling according to an embodiment of the present disclosure.

FIG. 4 is a schematic flowchart illustrating yet another method for receiving paging signaling according to an embodiment of the present disclosure. As shown in FIG. 4, the method further includes:
  in step S16, before receiving the paging signaling through the first SIM card during a paging occasion, information of each SIM card in the plurality of SIM cards is recorded.

In an embodiment, before receiving the paging signaling through the first SIM card during the paging occasion, each SIM card in the plurality of SIM cards can send its own information to the first SIM card. For example, the information can be directly sent to the first SIM card, or can be sent to the terminal first and then sent to the first SIM card by the terminal, so that the first SIM card can pre-record the information of each SIM card in the plurality of SIM cards.

Figure 5:
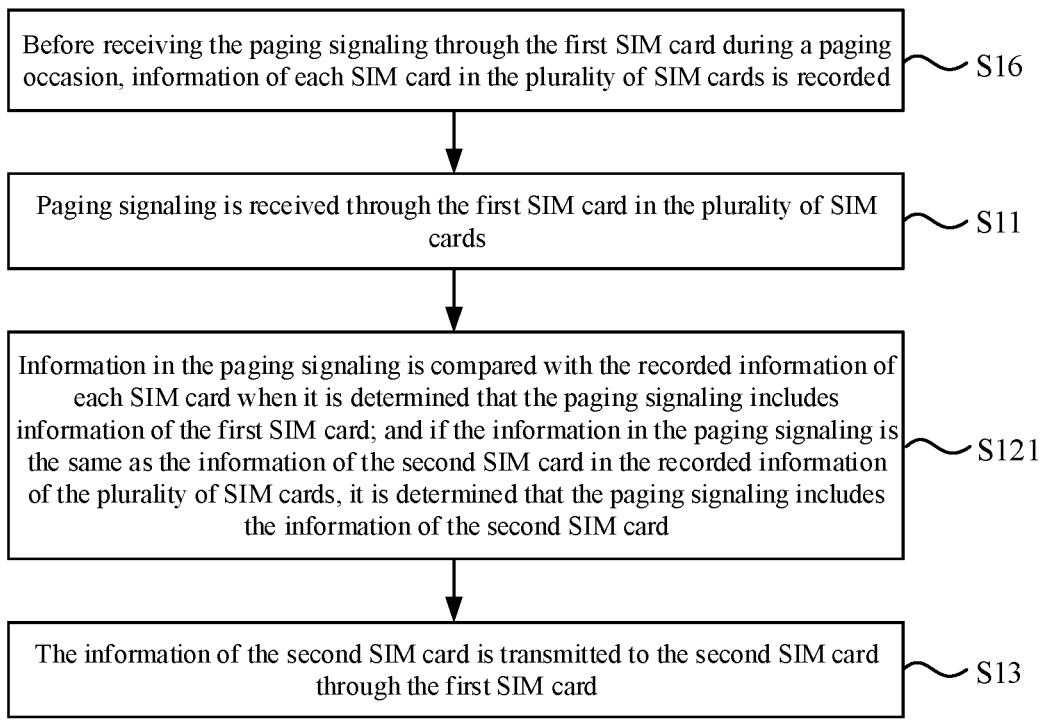
FIG. 5 is a schematic flowchart illustrating yet another method for receiving paging signaling according to an embodiment of the present disclosure.

FIG. 5 is a schematic flowchart illustrating yet another method for receiving paging signaling according to an embodiment of the present disclosure. As shown in FIG. 5, determining that the paging signaling received through the first SIM card includes the information of the second SIM card in the plurality of SIM cards includes:

in step S121, information in the paging signaling is compared with the recorded information of each SIM card when it is determined that the paging signaling includes information of the first SIM card; and if the information in the paging signaling is the same as the information of the second SIM card in the recorded information of the plurality of SIM cards, it is determined that the paging signaling includes the information of the second SIM card.

In an embodiment, whether the paging signaling includes information of the first SIM card itself, such as the identifier of the first SIM card, can be determined first through the first SIM card. In the case that the paging signaling includes the information of the first SIM card, whether the paging signaling includes information of the second SIM card is further determined.

The information in the paging signaling can be compared with the recorded information of the plurality of SIM cards through the first SIM card. If the information in the paging signaling is the same as the information of the second SIM card in the recorded information of the plurality of SIM cards, it is determined that the paging signaling includes the information of the second SIM card.

In an embodiment, regarding determining whether the paging signaling includes the information of the second SIM card through the first SIM card, the first SIM card can also pre-record an association relationship between the information of the first SIM card and the information of the second SIM card. If it is determined that the paging signaling includes the information of the first SIM card, the information of the second SIM card associated with the information of the first SIM card is searched according to the association relationship.

Specifically, which of the plurality of SIM cards is used as the second SIM card, and the information of the second SIM card is associated with the information of the first SIM card, can be set as required. Accordingly, the second SIM card can be selected flexibly, so that the first SIM card can send the information in the received paging signaling to the second SIM card only for the selected second SIM card.

Figure 6:
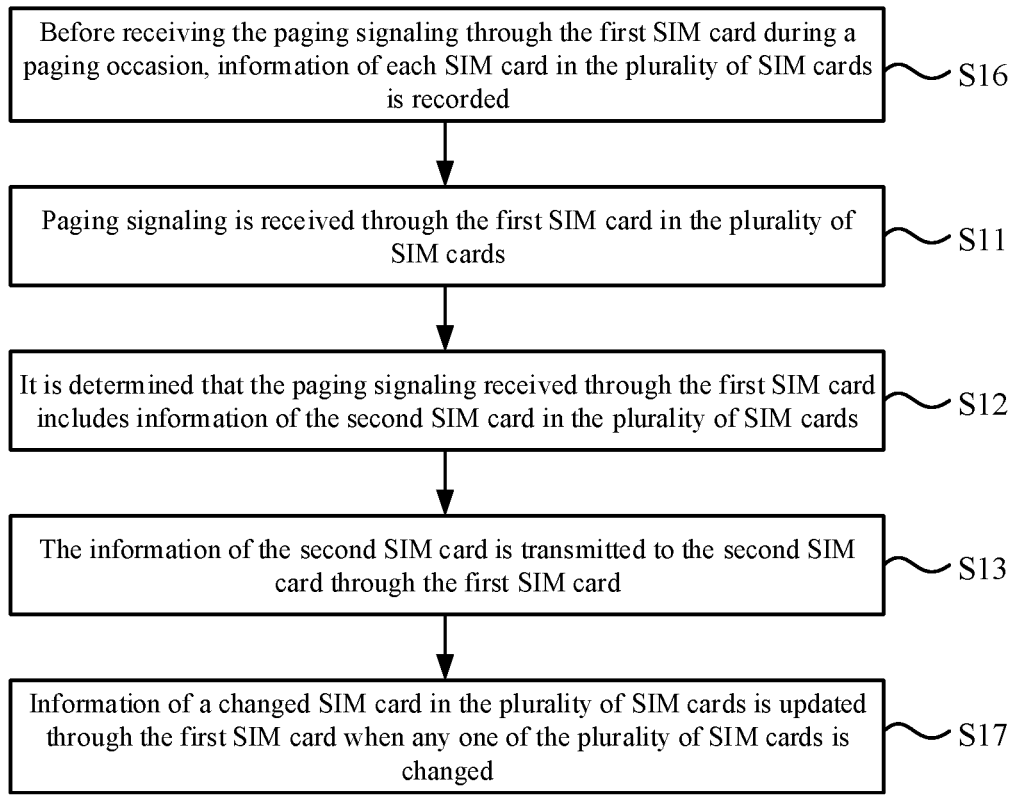
FIG. 6 is a schematic flowchart illustrating yet another method for receiving paging signaling according to an embodiment of the present disclosure.

FIG. 6 is a schematic flowchart illustrating yet another method for receiving paging signaling according to an embodiment of the present disclosure. As shown in FIG. 6, the method further includes:

in step S17, information of a changed SIM card in the plurality of SIM cards is updated through the first SIM card when any one of the plurality of SIM cards is changed.

In an embodiment, after the information of each SIM card in the plurality of SIM cards is recorded in the first SIM card, in the case that any SIM card in the plurality of SIM cards is changed, for example, a new SIM card is inserted into the terminal by a user, or the original SIM card is removed, or the SIM card is replaced, the terminal can send the information of the changed SIM card to the first SIM card, so that the information of the changed SIM card can be updated through the first SIM card, so as to keep the information of each SIM card in the plurality SIM cards recorded in the first SIM card as information of the SIM card currently set in the terminal.

It should be noted that step S17 can be executed after step S13 as shown in FIG. 6, or the execution order can also be adjusted according to actual conditions. For example, if there is a change of SIM cards in the plurality of SIM cards, step S17 can be executed before any step shown in FIG. 6.

FIG. 7 is a schematic flowchart illustrating a method for transmitting paging signaling according to an embodiment of the present disclosure. The method for transmitting paging signaling shown in this embodiment can be applicable to a base station. The base station can communicate with the terminal described in any one of the aforementioned embodiments. For example, the base station can perform communication based on a 4G protocol or a 5G protocol.

As shown in FIG. 7, the method for transmitting paging signaling may include the following step:

in step S21, paging signaling is transmitted (for example, by broadcasting) during a paging occasion of receiving the paging signaling through a first SIM card, wherein the paging signaling includes information of the second SIM card.

In an embodiment, the base station can broadcast the paging signaling including the information of the second SIM card during the paging occasion of receiving the paging signaling through the first SIM card. Accordingly, for a terminal provided with a first SIM card and a second SIM card, when the first SIM card is activated by the terminal for communication, the paging signaling can be received during the paging occasion of receiving the paging signaling through the first SIM card, so that the first SIM card can transmit the information of the second SIM card in the paging signaling to the second SIM card. Therefore, the second SIM card can receive the information of the second SIM card in the paging signaling when the second SIM card is not used by the terminal for communication.

FIG. 8 is a schematic flowchart illustrating another method for transmitting paging signaling according to an embodiment of the present disclosure. As shown in FIG. 8, the method further includes:

in step S22, before transmitting the paging signaling during the paging occasion of receiving the paging signaling through the first SIM card, the second SIM card associated with the first SIM card is determined according to a pre-recorded association relationship between the first SIM card and the second SIM card.

In an embodiment, the base station can pre-record the association relationship between the first SIM card and the second SIM card, wherein the association relationship can indicate that the first SIM card and the second SIM card are set in the same terminal. Therefore, after the second SIM card associated with the first SIM card is determined according to the association relationship, the paging signaling including the information of the second SIM card is broadcasted during the paging occasion of receiving the paging signaling through the first SIM card, so as to ensure that the first SIM card can transmit the information of the second SIM card in the paging signaling to the second SIM card located in the same terminal after the paging signaling is received.

FIG. 9 is a schematic flowchart illustrating yet another method for transmitting paging signaling according to an embodiment of the present disclosure. As shown in FIG. 9, the method further includes:

in step S23, before determining the second SIM card associated with the first SIM card according to the pre-recorded association relationship between the first SIM card and the second SIM card, the association relationship between the first SIM card and the second SIM card sent by the first SIM card is received when there is a communication connection with the first SIM card, and/or the association relationship between the first SIM card and the second SIM card sent by the second SIM card is received when there is a communication connection with the second SIM card.

In an embodiment, the base station can receive the association relationship between the first SIM card and the second SIM card. For example, when there is a communication connection with the first SIM card, the base station can receive the association relationship between the first SIM card and the second SIM card from the first SIM card. When there is a communication connection with the second SIM card, the base station can receive the association relationship between the first SIM card and the second SIM card from the second SIM card.

Optionally, the paging signaling further includes information of the first SIM card.

In an embodiment, the paging signaling broadcasted by the base station can include not only the information of the second SIM card, but also the information of the first SIM card, so that the first SIM card can determine that the paging signaling includes its own information. On the one hand, the information in the paging signaling can be transmitted to the second SIM card. On the other hand, a communication connection with the base station can be established through the first SIM card, or a system message can be updated through the first SIM card.

Optionally, the information of the second SIM card includes at least one of:
an identifier of the second SIM card and an indication bit of a system message.

Corresponding to the aforementioned embodiments of the method for receiving paging signaling and the method for transmitting paging signaling, the present disclosure also provides embodiments of an apparatus for receiving paging signaling and an apparatus for transmitting paging signaling.

Figure 10:
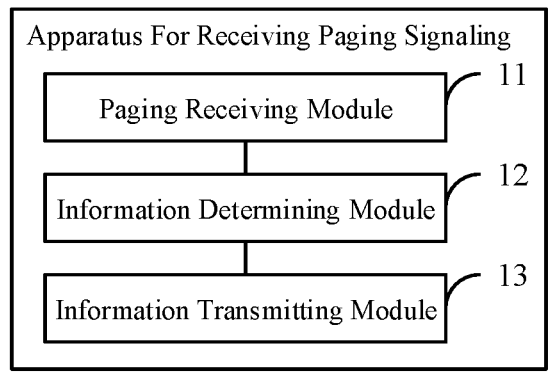
FIG. 10 is a schematic block diagram illustrating an apparatus for receiving paging signaling according to an embodiment of the present disclosure.

FIG. 10 is a schematic block diagram illustrating an apparatus for receiving paging signaling according to an embodiment of the present disclosure. The apparatus for receiving paging signaling described in this embodiment can be applicable to a terminal provided with one or more SIM cards. The terminal includes but is not limited to mobile phones, tablet computers, wearable devices, and other electronic devices. The terminal can include a plurality of SIM cards, which can belong to the same operator or different operators. The technical solutions of the present disclosure will be exemplarily explained below mainly in the case that the plurality of SIM cards include a first SIM card and a second SIM card.

As shown in FIG. 10, the apparatus for receiving paging signaling can include:
a paging receiving module 11 configured to receive paging signaling through the first SIM card in the plurality of SIM cards;
an information determining module 12 configured to determine that the paging signaling received through the first SIM card includes information of the second SIM card in the plurality of SIM cards;
a information transmitting module 13 configured to transmit the information of the second SIM card to the second SIM card through the first SIM card.

Optionally, the information of the second SIM card includes at least one of:
an identifier of the second SIM card and an indication bit of a system message.

Figure 11:
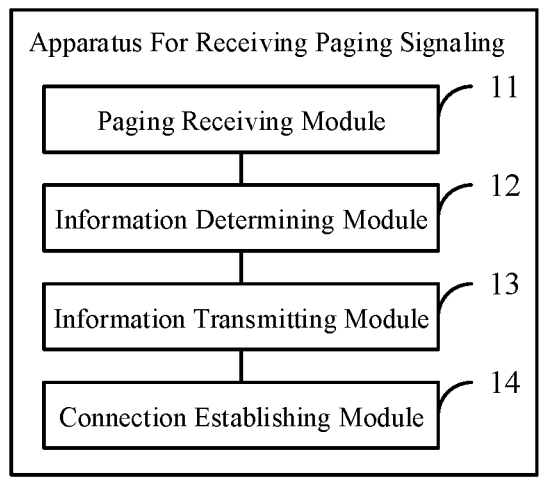
FIG. 11 is a schematic block diagram illustrating another apparatus for receiving paging signaling according to an embodiment of the present disclosure.

FIG. 11 is a schematic block diagram illustrating another apparatus for receiving paging signaling according to an embodiment of the present disclosure. As shown in FIG. 11, the information of the second SIM card includes the identifier of the second SIM card, and the apparatus further includes:
a connection establishing module 14 configured to establish a communication connection with a base station according to the identifier of the second SIM card through the second SIM card after the second SIM card is activated.

Figure 12:
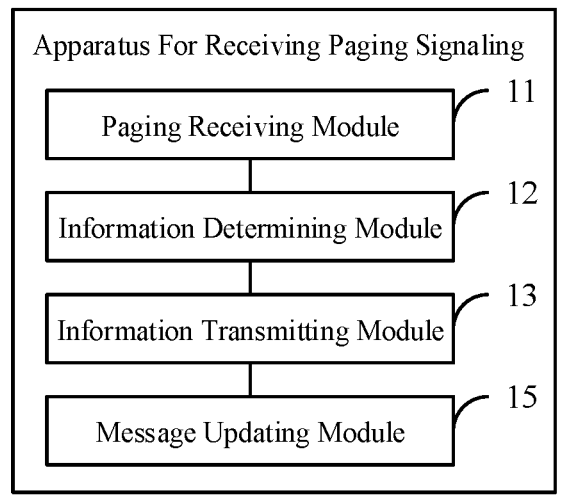
FIG. 12 is a schematic block diagram illustrating yet another apparatus for receiving paging signaling according to an embodiment of the present disclosure.

FIG. 12 is a schematic block diagram illustrating yet another apparatus for receiving paging signaling according to an embodiment of the present disclosure. As shown in FIG. 12, the information of the second SIM card includes the indication bit of the system message, and the apparatus further includes:
a message updating module 15 configured to update a system message of the base station according to the indication bit of the system message through the second SIM card after the second SIM card is activated.

Figure 13:
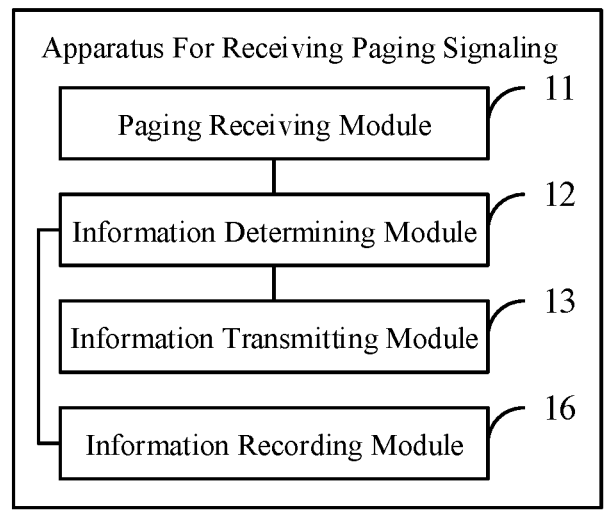
FIG. 13 is a schematic block diagram illustrating yet another apparatus for receiving paging signaling according to an embodiment of the present disclosure.

FIG. 13 is a schematic block diagram illustrating yet another apparatus for receiving paging signaling according to an embodiment of the present disclosure. As shown in FIG. 13, the apparatus further includes:
an information recording module 16 configured to record information of each SIM card in the plurality of SIM cards.

Optionally, the information determining module is configured to compare information in the paging signaling with the recorded information of each SIM card through the first SIM card when it is determined that the paging signaling includes information of the first SIM card; and
if the information in the paging signaling is the same as information of the second SIM card in the recorded information of the plurality of SIM cards, determine that the paging signaling includes the information of the second SIM card.

Figure 14:
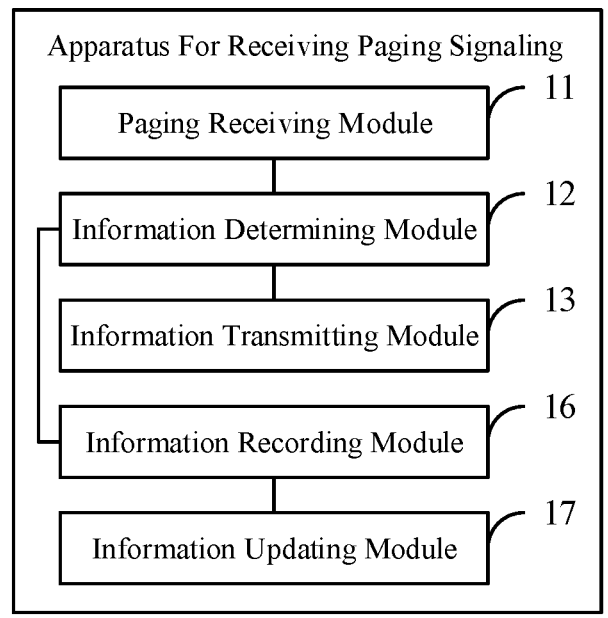
FIG. 14 is a schematic block diagram illustrating yet another apparatus for receiving paging signaling according to an embodiment of the present disclosure.

FIG. 14 is a schematic block diagram illustrating yet another apparatus for receiving paging signaling according to an embodiment of the present disclosure. As shown in FIG. 14 14, the apparatus further includes:
an information updating module 17, configured to update information of a changed SIM card in the plurality of SIM cards through the first SIM card when any one of the plurality of SIM cards is changed.

Figure 15:
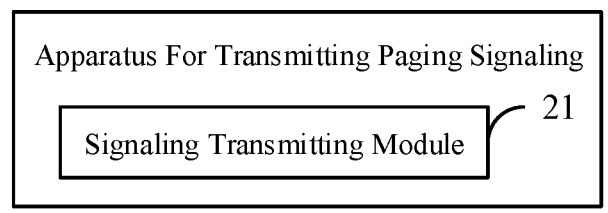
FIG. 15 is a schematic block diagram illustrating an apparatus for transmitting paging signaling according to an embodiment of the present disclosure.

FIG. 15 is a schematic block diagram illustrating an apparatus for transmitting paging signaling according to an embodiment of the present disclosure. The apparatus for transmitting paging signaling shown in this embodiment can be applicable to a base station. The base station can communicate with the terminal described in any one of the aforementioned embodiments. For example, the base station can perform communication based on a 4G protocol or a 5G protocol.

As shown in FIG. 15, the apparatus for transmitting paging signaling can include:
a signaling transmitting module 21 configured to transmit paging signaling during a paging occasion of receiving the paging signaling through a first SIM card, wherein the paging signaling includes information of the second SIM card.

Figure 16:
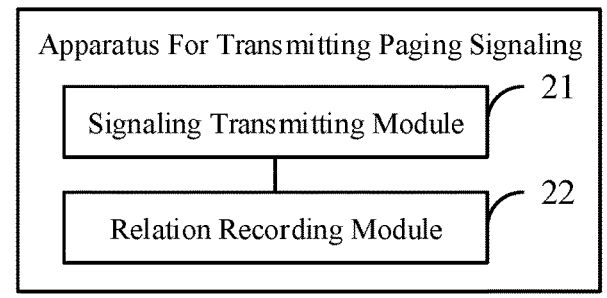
FIG. 16 is a schematic block diagram illustrating another apparatus for transmitting paging signaling according to an embodiment of the present disclosure.

FIG. 16 is a schematic block diagram illustrating another apparatus for transmitting paging signaling according to an embodiment of the present disclosure. As shown in FIG. 16, the apparatus further includes:
a relationship recording module 22 configured to determine the second SIM card associated with the first SIM card according to a pre-recorded association relationship between the first SIM card and the second SIM card.

Figure 17:
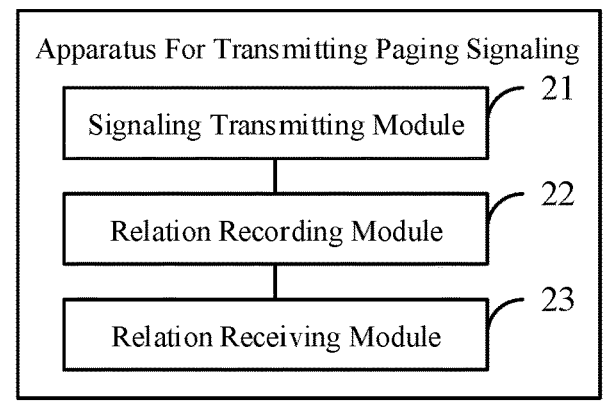
FIG. 17 is a schematic block diagram illustrating yet another apparatus for transmitting paging signaling according to an embodiment of the present disclosure.

FIG. 17 is a schematic block diagram illustrating yet another apparatus for transmitting paging signaling according to an embodiment of the present disclosure. As shown in FIG. 17, the apparatus further includes:

a relationship receiving module 23, configured to receive the association relationship between the first SIM card and the second SIM card sent by the first SIM card when there is a communication connection with the first SIM card, and/or receive the association relationship between the first SIM card and the second SIM card sent by the second SIM card when there is a communication connection with the second SIM card.

Optionally, the paging signaling further includes information of the first SIM card.

Optionally, the information of the second SIM card includes at least one of:

an identifier of the second SIM card and an indication bit of a system message.

With respect to the apparatus in the foregoing embodiments, the specific manner in which each module performs operations has been described in detail in the embodiments of the related method, and will not be elaborated here.

Since the apparatus embodiments basically correspond to the method embodiments, the apparatus embodiments can refer to the part of the description of the method embodiments. The apparatus embodiments described above are merely illustrative. The units described as separate components may or may not be physically separated, and the components displayed as units may or may not be physical units, that is, they may be located in one place, or they may be distributed in multiple network units. Some or all of the modules may be selected according to actual requirements to achieve the objectives of the solutions of the embodiments. Those of ordinary skill in the art can understand and implement it without creative work.

The embodiments of the present disclosure also provide an electronic device, including:

a processor; and a memory configured to store instructions executable by the processor;

wherein the processor is configured to implement the method for receiving paging signaling according to any one of the above embodiments.

The embodiments of the present disclosure also provide an electronic device, including:

a processor; and a memory configured to store instructions executable by the processor;

wherein the processor is configured to implement the method for transmitting paging signaling according to any one of the above embodiments.

Figure 18:
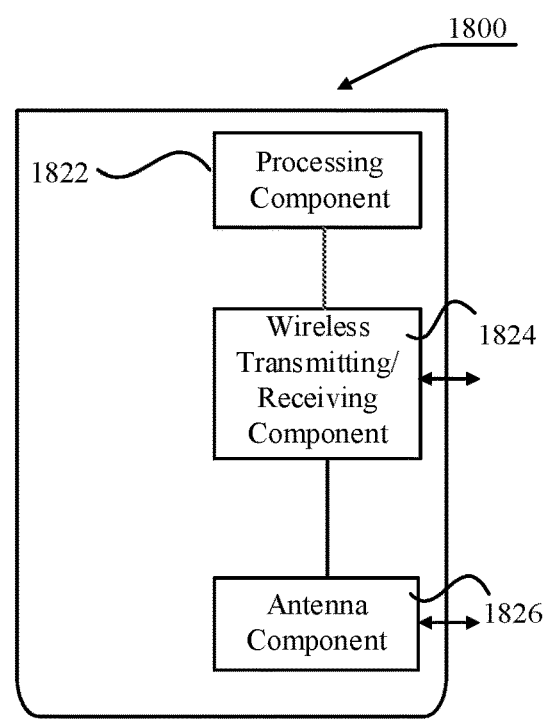
FIG. 18 is a schematic block diagram illustrating a device for transmitting paging signaling according to an embodiment of the present disclosure.

As shown in FIG. 18, FIG. 18 is a schematic block diagram illustrating a device 1800 for transmitting paging signaling according to an embodiment of the present disclosure. The device 1800 can be provided as a base station. Referring to FIG. 18, the device 1800 includes a processing component 1822, a wireless transmitting/receiving component 1824, an antenna component 1826, and a signal processing part specific to a wireless interface. The processing component 1822 can further include one or more processors. One of the processors in the processing component 1822 can be configured to implement the method for transmitting paging signaling according to any one of the above embodiments.

Figure 19:
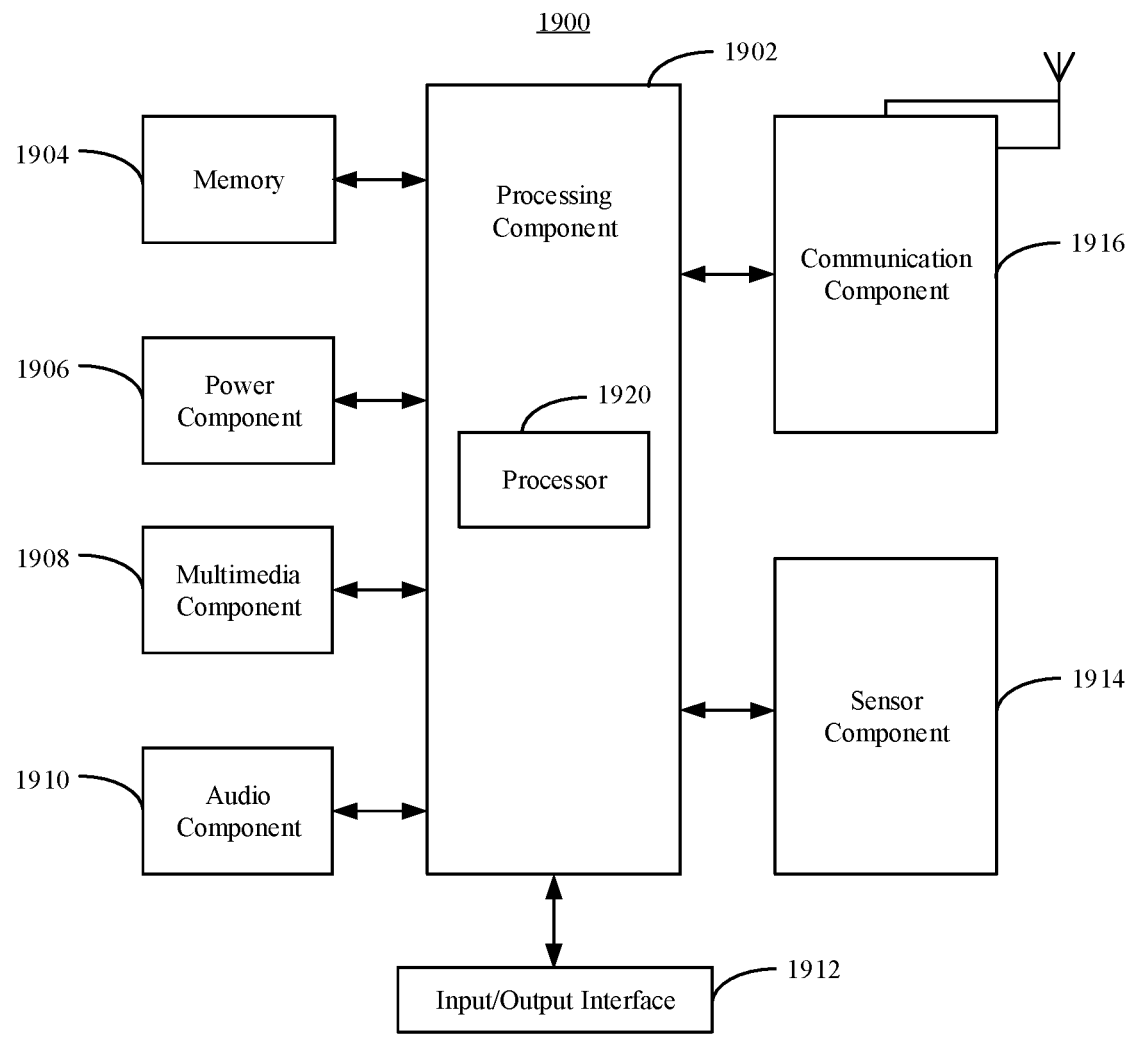
FIG. 19 is a schematic block diagram illustrating a device for receiving paging signaling according to an embodiment of the present disclosure.

FIG. 19 is a schematic block diagram illustrating a device 1900 for receiving paging signaling according to an embodiment of the present disclosure. For example, the device 1900 can be mobile phones, computers, digital broadcasting terminals, messaging devices, game consoles, tablet devices, medical devices, fitness devices, personal digital assistants, etc.

Referring to FIG. 19, the device 1900 can include one or more of the following components: a processing component 1902, a memory 1904, a power component 1906, a multimedia component 1908, an audio component 1910, an input/output (I/O) interface 1912, a sensor component 1914, and a communication component 1916.

The processing component 1902 generally controls the overall operations of the device 1900, such as operations associated with display, telephone calls, data communications, camera operations, and recording operations. The processing component 1902 can include one or more processors 1920 to execute instructions to complete all or part of the steps of the above methods. In addition, the processing component 1902 can include one or more modules to facilitate interaction between the processing component 1902 and other components. For example, the processing component 1902 can include a multimedia module to facilitate interaction between the multimedia component 1908 and the processing component 1902.

The memory 1904 is configured to store various types of data to support operations at the device 1900. Examples of such data include instructions for any application or method operating on the device 1900, contact data, phone book data, messages, pictures, videos, and so on. The memory 1904 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 1906 provides power to various components of the device 1900. The power component 1906 can include a power management system, one or more power sources, and other components associated with generating, managing, and distributing power for the device 1900. 11641 The multimedia component 1908 includes a screen that provides an output interface between the device 1900 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense boundaries of a touch or swipe action, but also detect the duration and pressure related to the touch or swipe action. In some embodiments, the multimedia component 1908 includes a front camera and/or a rear camera. When the device 1900 is in an operation mode, such as a shooting mode or a video mode, the front camera and/or the rear camera can receive external multimedia data. Each of the front and rear cameras can be a fixed optical lens system or have focal length and optical zooming capabilities.

The audio component 1910 is configured to output and/or input audio signals. For example, the audio component 1910 includes a microphone (MIC) that is configured to receive external audio signals when the device 1900 is in an operation mode, such as a call mode, a recording mode, and a voice recognition mode. The received audio signals can be further stored in the memory 1904 or transmitted via the communication component 1916. In some embodiments, the audio component 1910 further includes a speaker for outputting audio signals.

The I/O interface 1912 provides an interface between the processing component 1902 and peripheral interface modules. The peripheral interface modules can be keyboards, a click wheels, a buttons, or the like. These buttons can include, but are not limited to, home button, volume button, start button, and lock button.

The sensor component 1914 includes one or more sensors for providing the device 1900 with status assessment in various aspects. For example, the sensor component 1914 can detect an open/closed state of the device 1900, relative positioning of components, such as the display and keypad of the device 1900. The sensor component 1914 can also detect a change in position of the device 1900 or a component of the device 1900, the presence or absence of user contact with the device 1900, orientation or acceleration/deceleration of the device 1900, and temperature change of the device 1900. The sensor component 1914 can include a proximity sensor configured to detect the presence of nearby objects without any physical contact. The sensor assembly 1914 can also include a light sensor, such as a Complementary Metal-Oxide-Semiconductor (CMOS) or Charged Coupled Device (CCD) image sensor, for use in imaging applications. In some embodiments, the sensor component 1914 can further include an acceleration sensor, a gyro sensor, a magnetic sensor, a pressure sensor, or a temperature sensor.

The communication component 1916 is configured to facilitate wired or wireless communication between the device 1900 and other devices. The device 1900 can access a wireless network based on a communication standard, such as Wi-Fi, 2G or 3G, 4G LTE, 5G NR, or a combination thereof. In an exemplary embodiment, the communication component 1916 receives broadcast signals or broadcast-related information from an external broadcast management system via a broadcast channel. In one exemplary embodiment, the communication component 1916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1900 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the method for receiving paging signaling as described in any one of the above embodiments.

In an exemplary embodiment, there is also provided a non-transitory computer-readable storage medium including instructions, such as the memory 1904 including instructions executable by the processor 1920 of the device 1900 to implement the above methods. For example, the non-transitory computer-readable storage medium can be a ROM, a random access memory (RAM), a CD-ROM, a magnetic tape, a floppy disk, and an optical data storage device, etc.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method for receiving paging signaling, being applicable to a terminal comprising a plurality of Subscriber Identification Module (SIM) cards, wherein the plurality of SIM cards are disposed in the terminal, the method comprising:

receiving the paging signaling transmitted by a base station through a first SIM card in the plurality of SIM cards during a paging occasion of receiving the paging signaling through the first SIM card;

determining that the paging signaling received through the first SIM card comprises information of a second SIM card in the plurality of SIM cards; wherein paging occasions of receiving paging signaling for the first SIM card and the second SIM card are different;

transmitting the information of the second SIM card to the second SIM card through the first SIM card, wherein the first SIM card pre-records an association relationship between information of the first SIM card and the information of the second SIM card, if it is determined that the paging signaling received through the first SIM card comprises the information of the first SIM card, the information of the second SIM card associated with the information of the first SIM card is searched according to the association relationship, and the first SIM card sends the information in the received paging signaling to the second SIM card only for the associated second SIM card; and establishing a communication connection with the base station based on the information of the second SIM card after the second SIM card is activated.

2. The method according to claim 1, wherein the information of the second SIM card comprises at least one of:
an identifier of the second SIM card and an indication bit of a system message.

3. The method according to claim 2, wherein the information of the second SIM card comprises the identifier of the second SIM card, and the establishing the communication connection with the base station based on the information of the second SIM card after the second SIM card is activated comprises:
establishing the communication connection with the base station according to the identifier of the second SIM card after the second SIM card is activated.

4. The method according to claim 2, wherein the information of the second SIM card comprises the indication bit of the system message, and the method further comprises:
updating a system message of the base station according to the indication bit of the system message after the second SIM card is activated.

5. The method according to claim 1, further comprising:
recording information of each SIM card in the plurality of SIM cards before receiving the paging signaling through the first SIM card during the paging occasion.

6. The method according to claim 5, wherein the determining that the paging signaling received through the first SIM card comprises the information of the second SIM card in the plurality of SIM cards comprises:
comparing information in the paging signaling with the recorded information of each SIM card when it is determined that the paging signaling comprises information of the first SIM card;
if the information in the paging signaling is same as information of the second SIM card in the recorded information of the plurality of SIM cards, determining that the paging signaling comprises the information of the second SIM card.

7. The method according to claim 5, further comprising:
updating information of a changed SIM card in the plurality of SIM cards through the first SIM card when any one of the plurality of SIM cards is changed.

8. A method for transmitting paging signaling, being applicable to a base station, the method comprising:
transmitting the paging signaling during a paging occasion of receiving the paging signaling through a first Subscriber Identification Module (SIM) card, wherein the paging signaling comprises information of a second SIM card; wherein paging occasions of receiving paging signaling for the first SIM card and the second SIM card are different;
wherein the first SIM card and the second SIM card are disposed in a terminal comprising a plurality of SIM cards, the terminal transmits the information of the second SIM card to the second SIM card through the first SIM card, and
wherein the first SIM card pre-records an association relationship between information of the first SIM card and the information of the second SIM card, if it is determined that the paging signaling received through the first SIM card comprises the information of the first SIM card, the information of the second SIM card associated with the information of the first SIM card is searched according to the association relationship, and the first SIM card sends the information in the received paging signaling to the second SIM card only for the associated second SIM card; and
the terminal establishes a communication connection with the base station based on the information of the second SIM card after the second SIM card is activated.

9. The method according to claim 8, further comprising:
before the transmitting the paging signaling during the paging occasion of receiving the paging signaling through the first SIM card, determining the second SIM card associated with the first SIM card according to a pre-recorded association relationship between the first SIM card and the second SIM card.

10. The method according to claim 9, further comprising:
before the determining the second SIM card associated with the first SIM card according to the pre-recorded association relationship between the first SIM card and the second SIM card, receiving the association relationship between the first SIM card and the second SIM card sent by the first SIM card when there is a communication connection with the first SIM card, and/or receiving the association relationship between the first SIM card and the second SIM card sent by the second SIM card when there is a communication connection with the second SIM card.

11. The method according to claim 8, wherein the paging signaling further comprises information of the first SIM card.

12. The method according to claim 8, wherein the information of the second SIM card comprises at least one of:
an identifier of the second SIM card and an indication bit of a system message.

13. A terminal, comprising a plurality of Subscriber Identification Module (SIM) cards, wherein the plurality of SIM cards are disposed in the terminal, and the terminal further comprises:
a processor; and
a memory configured to store instructions executable by the processor,
wherein the processor is configured to:
receive paging signaling transmitted by a base station through a first SIM card in the plurality of SIM cards during a paging occasion of receiving the paging signaling through the first SIM card;
determine that the paging signaling received through the first SIM card comprises information of a second SIM card in the plurality of SIM cards, wherein paging occasions of receiving paging signaling for the first SIM card and the second SIM card are different;
transmit the information of the second SIM card to the second SIM card through the first SIM card; wherein the first SIM card pre-records an association relationship between information of the first SIM card and the information of the second SIM card, if it is determined that the paging signaling received through the first SIM card comprises the information of the first SIM card, the information of the second SIM card associated with the information of the first SIM card is searched according to the association relationship, and the first SIM card sends the information in the received paging signaling to the second SIM card only for the associated second SIM card; and
establish a communication connection with the base station based on the information of the second SIM card after the second SIM card is activated.

* * * * *

UNITED STATES PATENT AND TRADEMARK OFFICE
CERTIFICATE OF CORRECTION

PATENT NO. : 12,328,706 B2
APPLICATION NO. : 17/732868
DATED : June 10, 2025
INVENTOR(S) : Wei Hong Page 1 of 1

It is certified that error appears in the above-identified patent and that said Letters Patent is hereby corrected as shown below:

In the Specification

In Column 12, Line 41, delete "FIG. 14 14," and insert -- FIG. 14, --, therefor.
In Column 14, Line 45, delete "1900. 11641" and insert -- 1900. --, therefor.

Signed and Sealed this
Fifth Day of August, 2025

Coke Morgan Stewart
*Acting Director of the United States Patent and Trademark Office*